(12) United States Patent
Chu et al.

(10) Patent No.: US 11,941,519 B2
(45) Date of Patent: Mar. 26, 2024

(54) MACHINE LEARNING TRAINING PLATFORM

(71) Applicant: Waymo LLC, Mountain View, CA (US)

(72) Inventors: Pok Man Chu, Santa Clara, CA (US); Edward Hsiao, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 739 days.

(21) Appl. No.: 16/699,920

(22) Filed: Dec. 2, 2019

(65) Prior Publication Data

US 2021/0166117 A1 Jun. 3, 2021

(51) Int. Cl.
*G06N 3/08* (2023.01)
*G06N 3/04* (2023.01)
*G06N 3/10* (2006.01)

(52) U.S. Cl.
CPC ........... *G06N 3/08* (2013.01); *G06N 3/04* (2013.01); *G06N 3/10* (2013.01)

(58) Field of Classification Search
CPC .. G06N 3/08; G06N 3/04; G06N 3/10; G06N 20/00; G06N 5/043
See application file for complete search history.

(56) References Cited

U.S. PATENT DOCUMENTS

| | | | |
|---|---|---|---|
| 8,768,870 B1 | 7/2014 | Corrado et al. | |
| 9,563,854 B2 | 2/2017 | Cruz Mota et al. | |
| 10,152,676 B1* | 12/2018 | Strom | G06N 20/00 |
| 10,238,962 B2 | 5/2019 | Mnyals et al. | |
| 10,810,491 B1* | 10/2020 | Xia | G06N 3/04 |
| 2018/0181599 A1 | 6/2018 | Crabtree et al. | |
| 2018/0240011 A1* | 8/2018 | Tan | G06N 3/084 |
| 2018/0322387 A1* | 11/2018 | Sridharan | G06N 3/04 |
| 2019/0114537 A1* | 4/2019 | Wesolowski | G06N 3/105 |
| 2020/0090001 A1* | 3/2020 | Zargahi | G06N 20/20 |
| 2020/0334567 A1* | 10/2020 | Bhattacharjee | H04L 67/125 |
| 2020/0387834 A1* | 12/2020 | Hackett | G06N 20/20 |

(Continued)

FOREIGN PATENT DOCUMENTS

| | | | | |
|---|---|---|---|---|
| WO | WO-2019042571 A1 * | 3/2019 | ............ | G06N 20/00 |
| WO | 2019072316 A2 | 4/2019 | | |

OTHER PUBLICATIONS

Dean, Jeffrey, et al., Large Scale Distributed Deep Networks, Google Inc., 2012, pp. 1-11.

(Continued)

*Primary Examiner* — Dave Misir
(74) *Attorney, Agent, or Firm* — Botos Churchill IP Law (57) ABSTRACT

Aspects of the disclosure relate to training a machine learning model on a distributed computing system. The model can be trained using selected processors of the training platform. The distributed system automatically modifies the model for instantiation on each processor, adjusts an input pipeline to accommodate the capabilities of selected processors, and coordinates the training between those processors. Simultaneous processing at each stage can be scaled to reduce or eliminate bottlenecks in the distributed system. In addition, autonomous monitoring and re-allocating of resources can further reduce or eliminate bottlenecks. The training results may be aggregated by the distributed system, and a final model may then be transmitted to a user device.

18 Claims, 5 Drawing Sheets

(56) References Cited

U.S. PATENT DOCUMENTS

2021/0117310 A1* 4/2021 Lu ..................... G06F 11/3664
2021/0287080 A1* 9/2021 Moloney ................ G06V 10/96

OTHER PUBLICATIONS

Ben-Nun, Tal, et al., Demystifying Parallel and Distributed Deep Learning: An In-Depth Concurrency Analysis, Sep. 15, 2018, pp. 1-47.

* cited by examiner

MACHINE LEARNING TRAINING PLATFORM

BACKGROUND

Machine learning can be used to train a neural network model, for instance to classify particular types of objects in an image or to evaluate other types of large datasets. This may involve evaluating substantial amounts of information that may have many different parameters. The training process itself may require a significant amount of resources and time. While this can be done by multiple processors spread across a large computing system, a developer or user may need to significantly modify the code for the model in order to train that model on multiple processors and in order to aggregate the results from those processors. This may also be difficult and time-consuming. Furthermore, bottlenecks may result in one or more of the processors being used for training, which may slow down the overall process.

BRIEF SUMMARY

The technology relates generally to training a machine learning model on a distributed system. A user such as a developer is able to create one model that can be trained using selected processors of the training platform. The system automatically modifies the model for instantiation on each processing resource, adjusts the input pipeline to accommodate the selected processors, and coordinates the training between the processors. This can also include aggregating results returned from the selected processors. All of this may be done in a way that is transparent to the developer, resulting in a powerful, seamless training platform.

According to one aspect, a method for training a model on a distributed system is provided. The method comprises receiving, by the distributed system, user inputs including definitions for a model and training data for training the model; identifying, by the distributed system, a plurality of available processors having one or more attributes, the plurality of available processors being located on a plurality of computing devices in the distributed system; automatically selecting, by the distributed system based on the one or more attributes, a first subset of processors to train the model, the processors in the first subset each being configured to handle a threshold amount of simultaneous processing threads; automatically selecting, by the distributed system, a second subset of processors among the available processors to aggregate training results, the processors in the second subset each having a threshold amount of memory for aggregation; generating, by the distributed system, a copy of the model on each of the first subset of processors, each copy of the model having an identifier associated therewith; training, by the distributed system, the copies of the model on the first subset of processors; and aggregating, by the distributed system based on the identifiers of each copy of the model, the trained copies of the model on the second subset of processors.

In one example, the user inputs further include instructions for pre-processing the training data. In another example, the user inputs further include metrics for evaluating performance of the model. In a further example, the method of also includes generating, by the distributed system, an input pipeline to receive a subset of the training data for each of the plurality of computing devices on which one or more copies of the model are to be trained. This can include generating, by the distributed system, a number of simultaneous processing threads to perform data intake at each of the input pipelines, wherein the number of simultaneous processing threads for data intake is scaled by a number of copies of the model to be trained on a respective computing device. Here, the method may further comprise monitoring, by the distributed system, progress of data intake on the first subset of processors; and changing, by the distributed system based on the progress, a number of simultaneous threads for the data intake for one or more of the first subset of processors.

In another example, the method further comprises generating, by the distributed system, a number of simultaneous processing threads to pre-process the subset of training data received at each of the plurality of computing devices. Here, the number of simultaneous processing threads for pre-processing is scaled by a size of the subset of training data received at a respective computing device.

In yet another example, the method also includes monitoring, by the distributed system, progress of pre-processing on the first subset of processors; and changing, by the distributed system based on the progress, a number of simultaneous threads for pre-processing for one or more of the first subset of processors.

In another example, the method further includes monitoring, by the distributed system, progress of training on the first subset of processors. Here, the method also includes either (i) changing, by the distributed system based on the progress, a number of simultaneous threads for training for one or more of the first subset of processors, or (ii) moving, by the distributed system based on the progress, a portion of training data on a first processor of the first subset of processors for training a first copy of the model to a second processor of the first subset of processors for training a second copy of the model.

According to a further example, the method also includes generating, by the distributed system, a number of simultaneous processing threads to train copies of the model on each of the plurality of computing devices, wherein the number of simultaneous processing threads for training is scaled by either (i) an amount of the subset of training data received at a respective computing device, or (ii) an amount of pre-processed training data on the respective computing device.

The method may include generating, by the distributed system, performance data for each of the trained copies of the model; and comparing, by the distributed system, the trained copies of the model based on the performance data, wherein aggregating the trained copies of the model is based on the comparison. In this case, the method may further comprise selecting, by the distributed system based on the comparison, a subset of the trained copies of the model, wherein only the selected subset of trained copies are aggregated. Alternatively or additionally, the method may further comprise assigning, by the distributed system based on the comparison, weights to the trained copies of the model, wherein the trained copies of the model are aggregated based on the assigned weights.

Selecting the first subset of processors and selecting the second subset of processors may be based on evaluating a number of cores in each of the plurality of available processors. In one scenario, each of the first subset of processors may have at least a first number of cores and a first amount of memory, while each of the second subset of processors may have no more than a second number of cores and a second amount of memory. In this case, the first number of cores is larger than the second number of cores, and the first amount of memory is smaller than the second amount of memory. And in any of the configurations above, the identifiers may be unique identifiers. Alternatively or additionally, selecting the first subset of processors may be based on at least one of a size of the model or a speed at which the model can be trained by the plurality of available processors.

In accordance with other aspects of the technology, a distributed computing system for training a model is provided. The distributed computing system includes a plurality of available processors comprising a first subset of processors configured to handle a threshold amount of simultaneous processing threads, and a second subset of processors each having a threshold amount of memory. The distributed computing system is configured to receive user inputs including definitions for a model and training data for training the model and identify selected ones of the plurality of available processors having one or more attributes. The plurality of available processors is located on a plurality of computing devices in the distributed system. The distributed computing system is also configured to automatically select the first subset of processors based on the one or more attributes, to automatically select the second subset of processors based on the threshold amount of memory, and to generate a copy of the model on each of the first subset of processors. Each copy of the model has an identifier associated therewith. The first subset of processors is configured to train the copies of the model in accordance with the threshold amount of simultaneous processing threads. And the second subset of processors is configured to aggregate, based on the identifiers of each copy of the model, the trained copies of the model in accordance with the threshold amount of memory.

The distributed computing system may be further configured to monitor progress of training on the first subset of processors. In this case, the system may either (i) change, based on the progress, a number of simultaneous threads for training for one or more of the first subset of processors, or (ii) move, based on the progress, a portion of training data on a first processor of the first subset of processors for training a first copy of the model to a second processor of the first subset of processors for training a second copy of the model.

Alternatively or additionally, the distributed computing system may further be configured to generate performance data for each of the trained copies of the model, and compare the trained copies of the model based on the performance data. In this case, aggregation of the trained copies of the model is based on the comparison.

DETAILED DESCRIPTION

Overview

A distributed system for training a machine learning model is configured to receive user input including definitions for the model and training data for training the model. The distributed system includes a plurality of computing devices, where each of the computing devices may have one or more processors. As such, the distributed system may provide more available resources for training a given model than a single processing device. This approach avoids the need for a developer or other user to modify the code for the model in order to train that model on the distributed system. The net effect is to maximize throughput across the system without any tuning by the user. By way of example, the model could be a stop sign classifier that determines whether a portion of an image is a stop sign or not.

Example Systems

Figure 1:
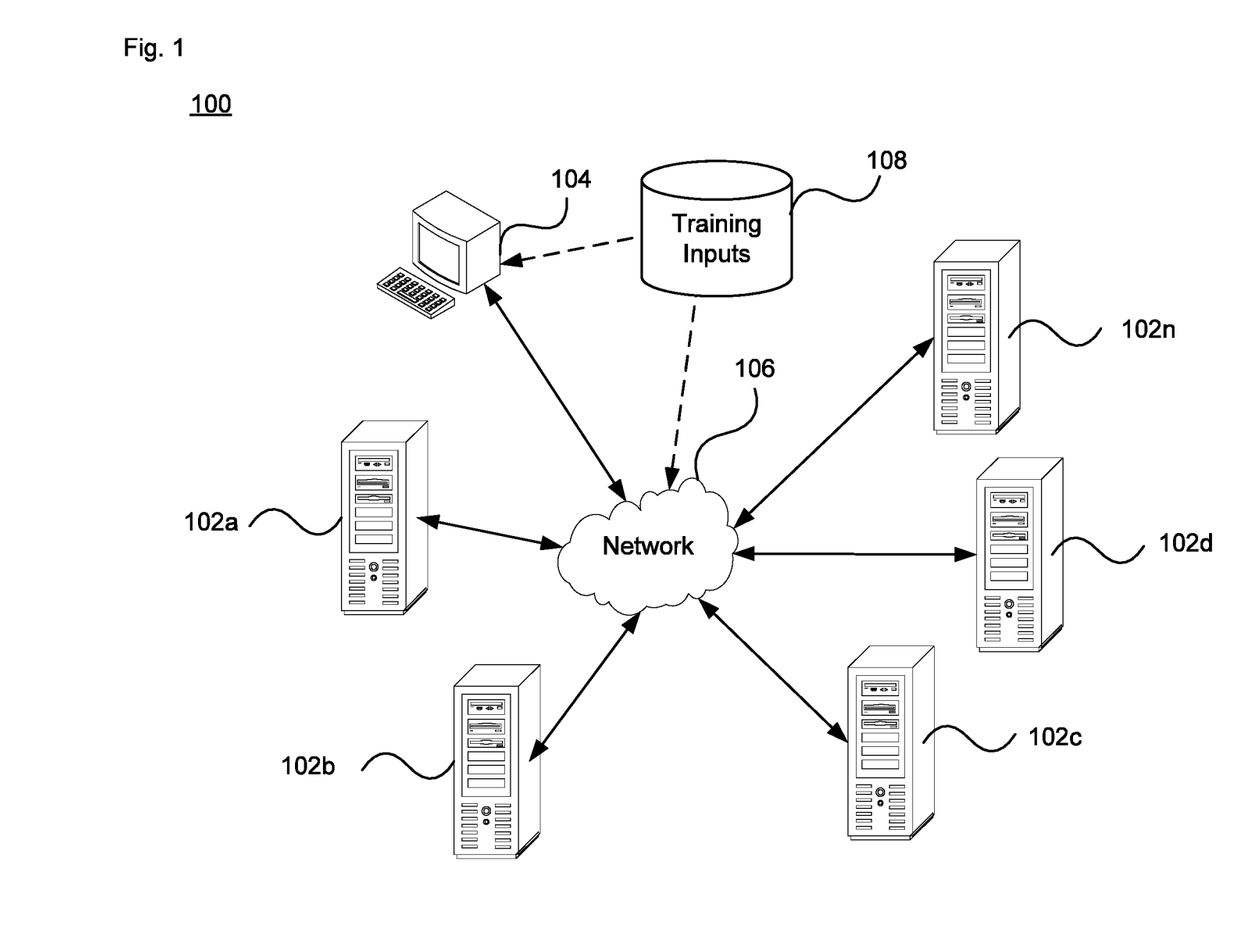
FIG. 1 is a functional diagram of an example distributed system in accordance with aspects of the disclosure.

FIG. 1 illustrates an example distributed system 100 for generating and reviewing labels according to aspects of the disclosure. In this example, the distributed system 100 includes a plurality of computer devices 102, in particular computer devices 102a, . . . , 102n, which may be a load balanced server farm or cloud-based system that exchange information with different nodes of a network for the purpose of receiving, processing and transmitting the data to and from other computing devices. For instance, the computing devices 102 may include one or more server computing devices that are capable of communicating with the other computing devices of the server farm or cloud-based system, as well as user device 104, via network 106.

The user device 104 may be a computer device (e.g., desktop or laptop computer) used by a developer or other user to create the model to be evaluated by the distributed system 100. As indicated by the dashed lines, training inputs (training data) from database 108 may be provided to one or both of the user device 104 and/or the computer devices 102 via the network 106. As shown in block diagram 200 of FIG. 2, the user device 104 includes one or more processors 202, memory 204 and other components typically present in general purpose computing devices. The memory 204 stores information accessible by the one or more processors 202, including instructions 206 and data 208 that may be executed or otherwise used by the processor 202. The memory 204 may be of any type capable of storing information accessible by the processor, including a computing device-readable medium. The memory is a non-transitory medium such as a hard-drive, memory card, optical disk, solid-state, tape memory, or the like. Devices may include different combinations of the foregoing, whereby different portions of the instructions and data are stored on different types of media.

Figure 2:
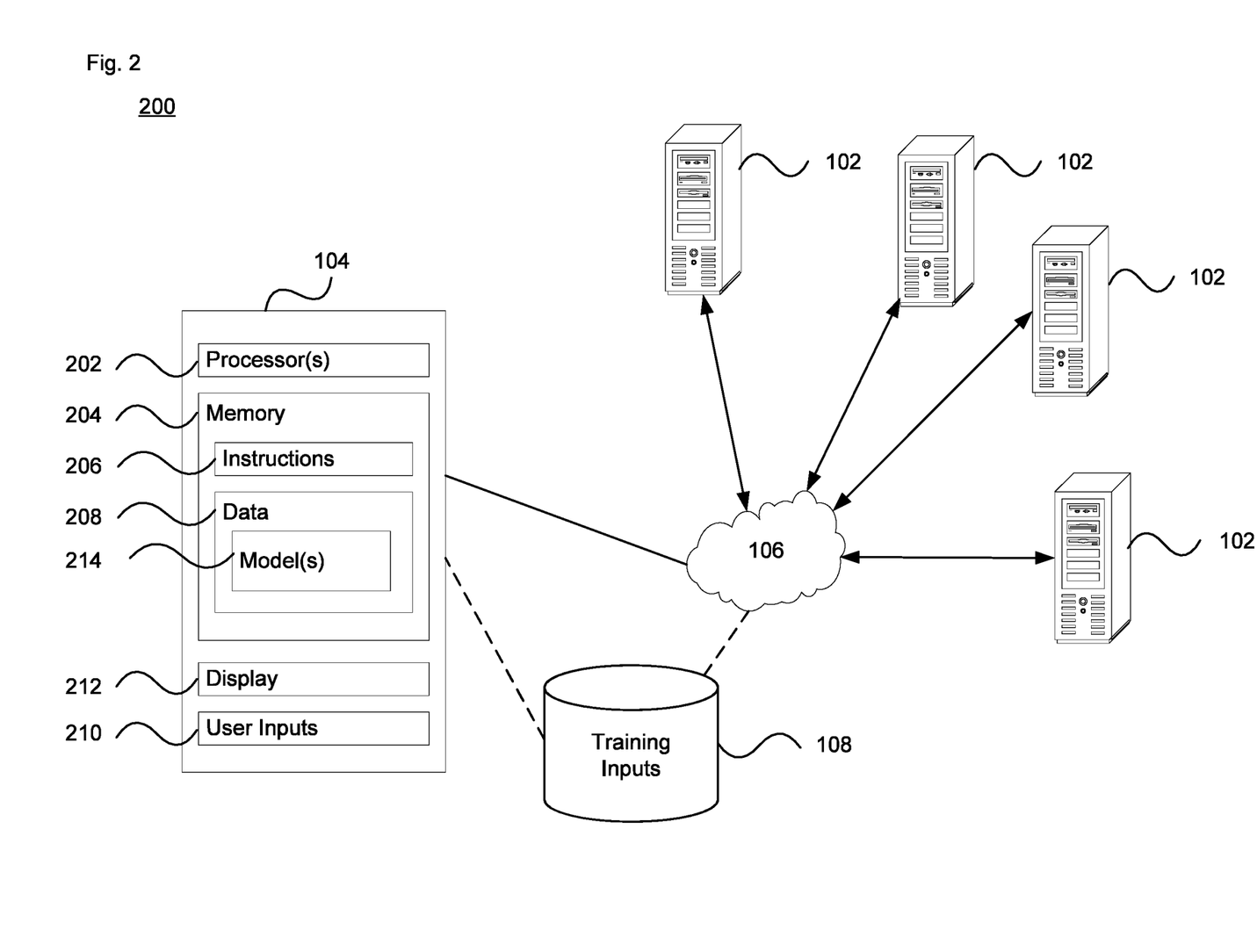
FIG. 2 is an example user device in accordance with aspects of the disclosure.

The instructions 206 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 208 may be retrieved, stored or modified by one or more processors 204 in accordance with the instructions 206.

The one or more processor 202 may be any conventional processors, such as commercially available CPUs. Alternatively, the one or more processors may be a dedicated device such as an ASIC or other hardware-based processor. Although FIG. 2 functionally illustrates the processor(s), memory, and other elements of the user device 104 as being within the same block, such devices may actually include multiple processors, computing devices, or memories that may or may not be stored within the same physical housing. Similarly, the memory 204 may be a hard drive or other storage media located in a housing different from that of the processor(s) 202, such as in training inputs database 108. Accordingly, references to a processor or computing device will be understood to include references to a collection of processors or computing devices or memories that may or may not operate in parallel.

The user device 104 may include all of the components normally used in connection with a computing device such as the processor and memory described above as well as a user interface subsystem. The user interface subsystem may include one or more user inputs 210 (e.g., a mouse, keyboard, touch screen and/or microphone) and one or more electronic displays 212 (e.g., a monitor having a screen or any other electrical device that is operable to display information). Output devices besides the electronic display 212, such as speaker(s) (not shown), may also be part of the user device 104. The user may build and store one or more models 214 in the data portion of memory 204. By way of example only, the model may be for a sensor package for an autonomous vehicle, a kinematic model of an autonomous vehicle such as a self-driving passenger car or a truck, behavior model(s) for different kinds of objects detected in an environment in which an autonomous vehicle may operate, etc.

Figure 3:
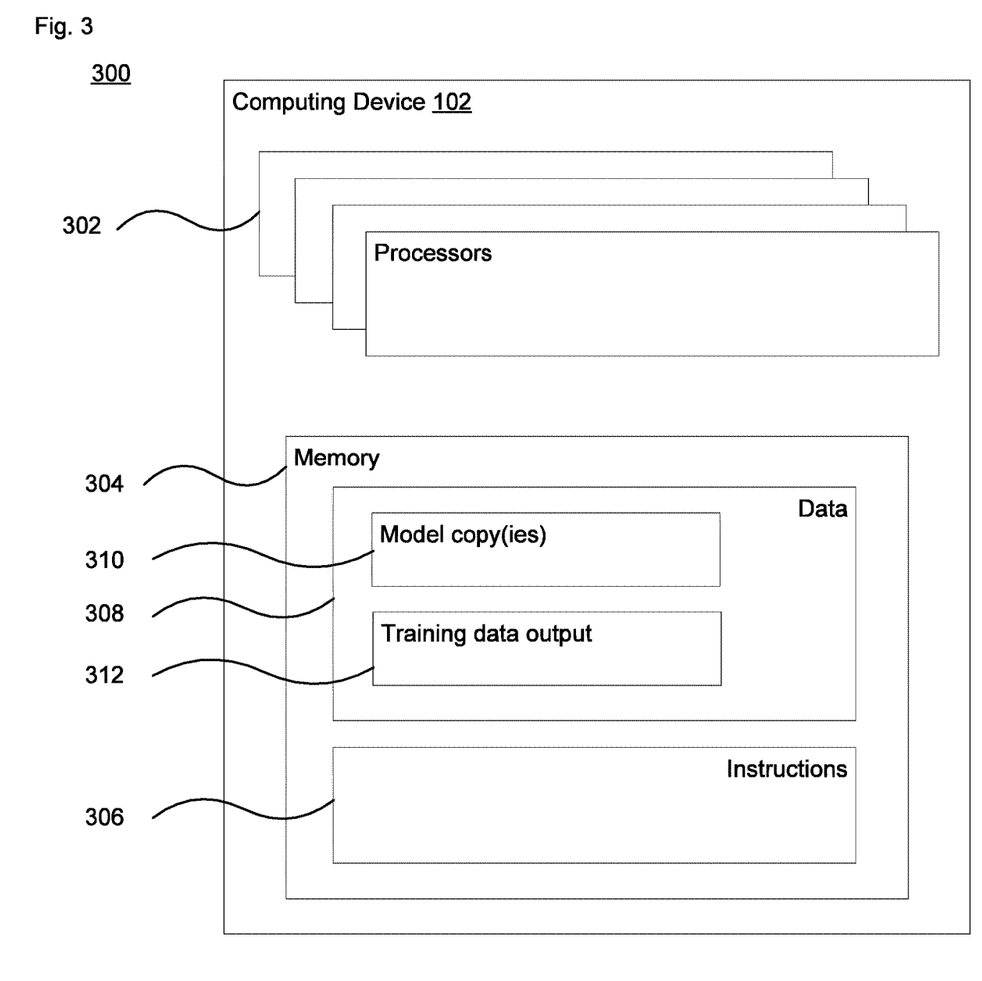
FIG. 3 is an example computing device in accordance with aspects of the disclosure.

FIG. 3 illustrates an example 300 of computing device 102. As noted above, the computing device 102 may be a server that is part of a load balanced server farm or cloud-based system. As shown, the computing device 102 includes a plurality of processors 302 and memory 304 typically present in general purpose computing devices. Each processor 302 may have multiple cores that are able to operate in parallel. The memory 304 stores information accessible by the processors 302, including instructions 306 and data 308 that may be executed or otherwise used by the processors 302. As with memory 204, the memory 304 may be of any type capable of storing information accessible by the processors, including a computing device-readable medium. The memory is a non-transitory medium such as a harddrive, memory card, optical disk, solid-state, tape memory, or the like. The computing device 102 may include different combinations of the foregoing, whereby different portions of the instructions and data are stored on different types of media.

As with instructions 206, the instructions 306 may be any set of instructions to be executed directly (such as machine code) or indirectly (such as scripts) by the processors. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. By way of example, the programming language may be C#, C++, JAVA or another computer programming language. Similarly, any one components of the instructions or programs may be implemented in a computer scripting language, such as JavaScript, PHP, ASP, or any other computer scripting language. Furthermore, any one of these components may be implemented using a combination of computer programming languages and computer scripting languages.

The data 308 may be retrieved, stored or modified by one or more processors 302 in accordance with the instructions 306. As shown, the data may include one or more model copies 310 corresponding to a given model 214 of user device 104. Here, each model copy may correspond to a particular one of the processors 302. The data 308 may also include training data output 312, which may be combined, aggregated or otherwise processed in conjunction with training data outputs from other computing devices in the distributed system.

As with processor(s) 202, the processors 302 may be any conventional processors, such as commercially available CPUs. Alternatively, the processors 302 may be dedicated devices such as ASICs or other hardware-based processors. By way of example only, the processors 302 may each be, e.g., a graphic processing unit (GPU), a central processing unit (CPU), a tensor processing unit (TPU) or any combination thereof.

Although FIG. 3 functionally illustrates the processor(s) and memory of the computing device 104 as being within the same block, such devices may actually include multiple processors, computing devices, or memories that may or may not be stored within the same physical housing. Similarly, the memory 304 may be a hard drive or other storage media located in a housing different from that of the processors 302. Accordingly, references to processors or computing device will be understood to include references to a collection of processors or computing devices or memories that may or may not operate in parallel.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted, unless expressly stated otherwise.

The developer or other user may configure a particular model via the user device 104. This may include specifying any parameters and/or definitions for the model, including any inputs (e.g., images or lidar point clouds) and outputs (e.g., objects recognized from the images or lidar point clouds) of the model. The definition of the model may be a combination of convolution layers, fully connected layer and a sigmoid output activation. By way of example, the definitions may include one or more parameters (e.g., color, size, shape) for generating the outputs using the inputs, and weights for these parameters (e.g., shape of the object is given more weight than color). The definitions may also include a type of the model (e.g., neural network) and properties specific to the type of model (e.g., number and properties of layers for the network). The training data may be raw data (e.g., captured images or received lidar point cloud information) that had been reviewed by a human and manually labeled by the human (e.g., objects recognized in the images).

Additionally, there may be user inputs including instructions for pre-processing or post-processing the training data. Pre-processing may include applying transformations, filters, normalizations, etc., to the training data. For example, raw images or lidar point clouds may be filtered and normalized before being used for training a model to recognize objects from images. Pre-processing may further include splitting the training data into a training data set for training the model, and a testing data set for testing performance of the model. The inputs may also include metrics for evaluating the training results. For instance, the metrics may include thresholds for loss, confidence levels, etc. By way of example, after training, each trained copy of the model may be evaluated using the metrics specified by the developer or other user.

Once the user inputs or other instructions are received, the distributed system may automatically identify without user input a plurality of processors in the distributed system that may be used for training the model. The plurality of processors may be located on the same computing device or distributed on more than one computing device. In this regard, the distributed system may have a stored list of computing devices in the distributed system, and communicate with each of the computing devices to determine which processor(s) on each computing devices are available.

A processor is either in use or not in use. By way of example the architecture described herein may share processors on a first come first serve basis. A time limit may be associated with a given training job, for instance by having a time limit of one week, no more than 72 hours, etc. When there is contention regarding use of processors, this could be resolved manually or by the system itself identifying available processors. If a sufficient amount of processors is not available for the given job, the system would return an error.

The distributed system may receive information on the available processors from the computing devices. For example, the received information may include an identification of each available processor and amount of available resources (e.g., RAM, number of cores, etc.) on each available processor. For another example, the received information may include a type of each available processor, such as whether the processor is GPU, a CPU, a TPU or some other type of processor.

Figure 4:
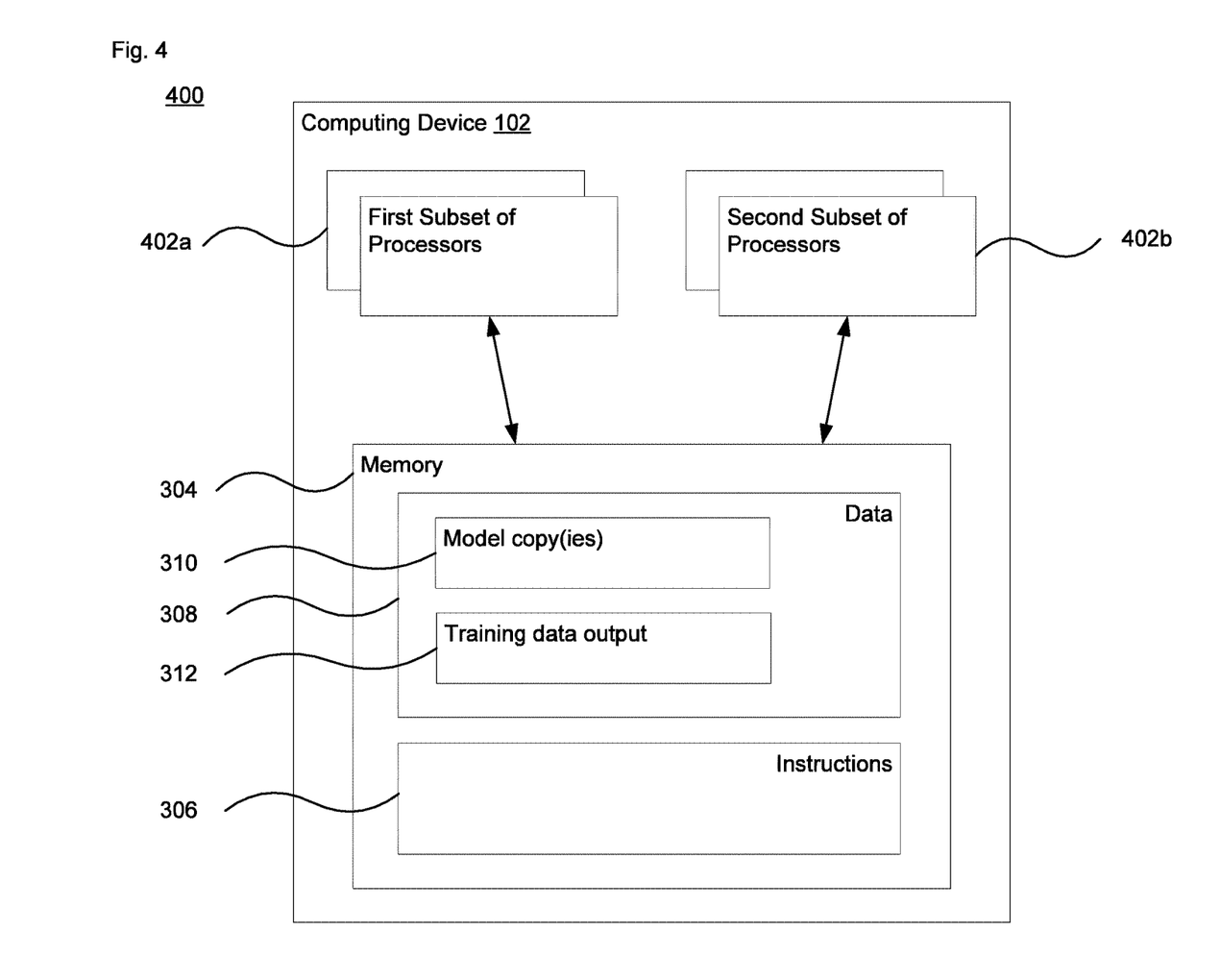
FIG. 4 is another example computing device in accordance with aspects of the disclosure.

Based on the received information, the distributed system may select a subset of the available processors for training the model received from the user device. In this regard, the distributed system may select a first subset of the available processors for performing parallel tasks, and a second subset of the available processors for performing aggregation tasks. Each subset of processors may have different attributes beneficial for certain tasks. FIG. 4 illustrates one example 400 showing a first subset of processors 402a and a second subset of processors 402b. As shown, both subsets of processors may access the same memory, although separate memories may be provided for each subset or each individual processor (or processor core). Selection of the processors may be performed by a coordinator processor from among the processors of the computing devices of the distributed system. In one example, the coordinator processor may be dedicated by the system, either assigned as a default or upon selection of the processors for training the model. In another example, the coordinator could be changed at any point during the training process.

For example, a CPU may have a few cores with large memories that are capable of handling a few simultaneous processing threads. In contrast, a GPU or TPU may have hundreds of cores with smaller memories that are capable of handling thousands of simultaneous processing threads. As such, available processors that are GPUs or TPUs may more efficiently run parallel processes or perform other operations (e.g., interpolation), while available processors that are CPUs may more efficiently aggregate large amounts of data. In addition, different processor types may train a model at different speeds. As such, models of different sizes may be more suited for different processor types (e.g., a GPU may be selected for a large model with many variables while a CPU may be selected for a small model with only a few variables). Therefore, the distributed system may select available processors that are GPUs or TPUs for handling tasks involving many simultaneous processing threads, such as data intake, pre-processing, and training, and select available processors that are CPUs for handling tasks involving large volumes of data, such as aggregating the training results. Alternatively, the system may perform direct GPU/GPU or TPU/TPU communication via a message passing framework instead of aggregating the training results at the CPU(s).

In one example, aggregation may include averaging the results. In another example, aggregated results may be weighted or otherwise adjusted based on the training of the different models. For instance, models with better results may be weighted more heavily or ranked higher than other models.

According to one aspect of the technology, processor selection, model assignment and/or aggregation methodology is transparent to the user (e.g., the model developer), without requiring the user to specify particular details about how to train the model across a set of processors and other system resources. The framework is able to handle selection and aggregation, which allows the model creator to focus on aspects of the model itself. For instance, the framework is able to implement data handling for specific processor types, e.g., based on various processor attributes, which avoids potential user errors due to typos or other mistakes.

Subsets of available processors may additionally or alternatively be selected based on other factors, such as the amount of available RAM on the available processors or computational complexity. By way of example, some models may require more memory than others. In this case, the system may automatically assign memories based on what memory resources are available on a particular machine. Similarly, some models may be more computationally expensive than other models. In this case, the system could employ machines with more powerful GPUs or TPUs to handle such computationally intensive tasks.

Once the subsets of processors are selected, the distributed system generates a copy of the model at each of the first subset of processors. For example, each of the selected GPUs or TPUs in the distributed system may generate a copy of the model based on the definitions for the model in the user inputs. In this regard, each copy of the model may be near-identical, but have a unique identification. It is not required that each copy have a unique identification, but identifiers may be used to track model results and other analytics, such as to evaluate different types of training behavior. In one scenario, the system may refer back to which model was trained in a certain way (e.g., using a data set for a common scenario versus a rare scenario). This information may be used to weight or augment the results of one copy of the model over other copies, such as to recalibrate to match a real world scenario. This allows the system to automatically weight or boost certain copies of the model based on a desired distribution. In addition, different copies of the model may be configured to work on different types of data associated with the model.

For example, the model type, parameters, and weights may be identical for each copy of the model. However, the unique identifications may allow each copy of the model to be trained separately on a respective GPU or TPU, and to be analyzed separately by the distributed system before aggregated into a final model. For example, the system may read data from different locations on disk (shards) so that the load is distributed. As part of the "near identical" model copies, the system may introduce some amount of noise so that it is not training the exact same model on each of the GPUs or TPUs. For instance, the system may apply one or more perturbations to the input, such as random cropping, changes in intensity, contrast, flipping and/or rotations, etc. This allows the neural net to be more invariant to these types of transformations as part of the training process.

The distributed system may then coordinate the first subset of processors to perform various tasks on their respective copies of the model. In this regard, the distributed system may prepare an input pipeline for each computing device in the distributed system for which one or more copies of the model are provided. By way of example, the coordination may be performed by the coordinator. The distributed system may generate a number of simultaneous processing threads for intake of training data at each computing device, where the number of simultaneous processing threads for data intake may be scaled by the number of copies of the model to be trained on that computing device.

For example, if a first computing device has 5 selected GPUs each provided with a copy of the model, and a second computing device has 10 selected GPUs each provided with a copy of the model, the distributed system may generate twice the number of simultaneous processing threads for handling intake of training data at the second computing device than the first computing device. As such, the second computing device may receive twice the amount of training data as the first computing device. For instance, the distributed system my replicate the model and input pipeline exactly, and enable the pipeline to select random subsets of the data to process. In this case, the computing devices may coordinate by passing information through parameter servers and then re-broadcasting what the current state of the coordinated system is at a given time. Depending on how the model is trained, there may be constraints on the subsets of data to be processed. For example, if the training is done synchronously, then at the synchronization point all models would need to finish processing their random subsets of data before moving on to the next subset.

This framework enables the distributed system to optimize the implementation of the resource assignment as warranted. For example, the distributed system (e.g., the coordinator) can allocate layers in the neural net that can be processed in parallel across multiple GPUs or TPUs. This allow the system to support larger models and make computation faster.

As mentioned above, the training data may need to be pre-processed, for instance based on instructions received from the user device. In this regard, the distributed system may generate a number of simultaneous processing threads for pre-processing the training data received by each computing device in the distributed system for which one or more copies of the model are provided. The number of simultaneous processing threads for pre-processing may be scaled by the amount of training data received at that computing device. Continuing from the example above, since the second computing device received twice the amount of training data as the first computing device, the distributed system may generate twice the number of simultaneous processing threads for pre-processing the received training data at the second computing device than at the first computing device.

Once any required pre-processing is completed, the copies of the model may be trained on each of the first subset of processors (e.g., processors 402a in FIG. 4). In this regard, the distributed system may generate a number of simultaneous processing threads for training on each computing device in the distributed system for which one or more copies of the model are provided. The number of simultaneous processing threads for training may be scaled by the amount of pre-processed training data at that computing device. Continuing from the example above, if the second computing device have twice the amount of pre-processed training data as the first computing device, the distributed system may generate twice the number of simultaneous processing threads for training the copies of the model on the second computing device than on the first computing device.

During data intake, pre-processing, and training as described above, the distributed system may monitor progress of each of the first subset of processors. Based on the progress, the distributed system may change the numbers of simultaneous threads for the first subset of processors. Continuing from the examples above, even though the number of simultaneous processing threads were scaled at each stage, some of the selected GPUs or TPUs may have slower progress than others. For example, the distributed system may determine that a first GPU or TPU is receiving training data at a slower rate than a second GPU or TPU. As such, the distributed system may increase the number of simultaneous processing threads for handling intake at the first GPU or TPU.

For another example, the distributed system may determine that training a first copy of the model on the first GPU or TPU is slower than training a second copy of the model on the second GPU or TPU. As such, the distributed system may move some training data for training the first copy of the model from the first GPU to the second GPU to be used for training the second copy of the model instead. Depending on the processor architecture, the distributed system may know the types of GPUs or TPUs that are available on certain machines. From benchmarks, the system may determine the relative performance of these processors, which can be used when assigning tasks to different computing devices or processors. This relative performance evaluation can be done by the coordinator, or by another device in the distributed system.

Once each copy of the model is trained by the first subset of processors and buffered or otherwise stored in memory, the distributed system may evaluate performance of each trained copy of the model. For example, the performance data for each trained copy of the model may be generated by each respective GPU or TPU that trained that copy of the model. For instance, the performance data may be generated based on the metrics received from the user device. The distributed system may evaluate and compare the performance data from each of the trained copies of the model. Examples of performance data include, e.g., loss, time per batch, data input rates, etc.

In some instances, the distributed system may aggregate the trained copies of the model based on the performance data. For instance, the distributed system may select a subset of the trained copies of the model for aggregation based on the performance data. By way of example only, the distributed system may select trained copies of the model with performance data at the $80^{th}$ percentile, or copies of the model that meet other criteria. For another instance, the distributed system may assign a weight to each of the trained copies of the model, where the weight is determined based on the performance data for that trained copy of the model. According to one aspect, the aggregation may include averaging the outputs of the models. One way is to only average the ones at the 80th percentile or more, while another is to perform a weighted average based on the overall accuracy.

In order to aggregate the trained copies of the model, the distributed system (e.g., the coordinator) may instruct the first subset of processors to send the trained copies of the model to the second subset of processors in the distributed system. For example as described above, the second subset of processors may be selected CPUs, which may receive and aggregate the trained copies of the model. For example, the CPUs may receive and aggregate the trained copies of the model with $80^{th}$ percentile performance data. For another example, the CPUs may receive and aggregate the trained copies of the model based on the assigned weights. According to one scenario, the selected models are aggregated once all the models have been trained. There are different ways to aggregate models, which include averaging their output, learning an additional classifier with those outputs as the inputs (e.g. logistic regression), etc. Alternatively, a voting mechanism can be employed, for instance to choose the one that has the most votes.

The results of the training may comprise a final model, which may result from the aggregation of the trained copies of the model. The final model may then be transmitted to the user device. In some instances, the second subset of processors may further generate performance data for the final model, and output the performance data of the final model to the user along with the final model. Additionally, the distributed system may also output the performance data for one or more of the trained copies to the user device. The final model and/or the performance data can be used in simulations or real-world operation, for instance to detect objects in an environment around a self-driving vehicle. By way of example, the final model is evaluated in simulation and other testing. Then if the performance criteria are met, the model is deployed in the self-driving vehicle.

Figure 5:
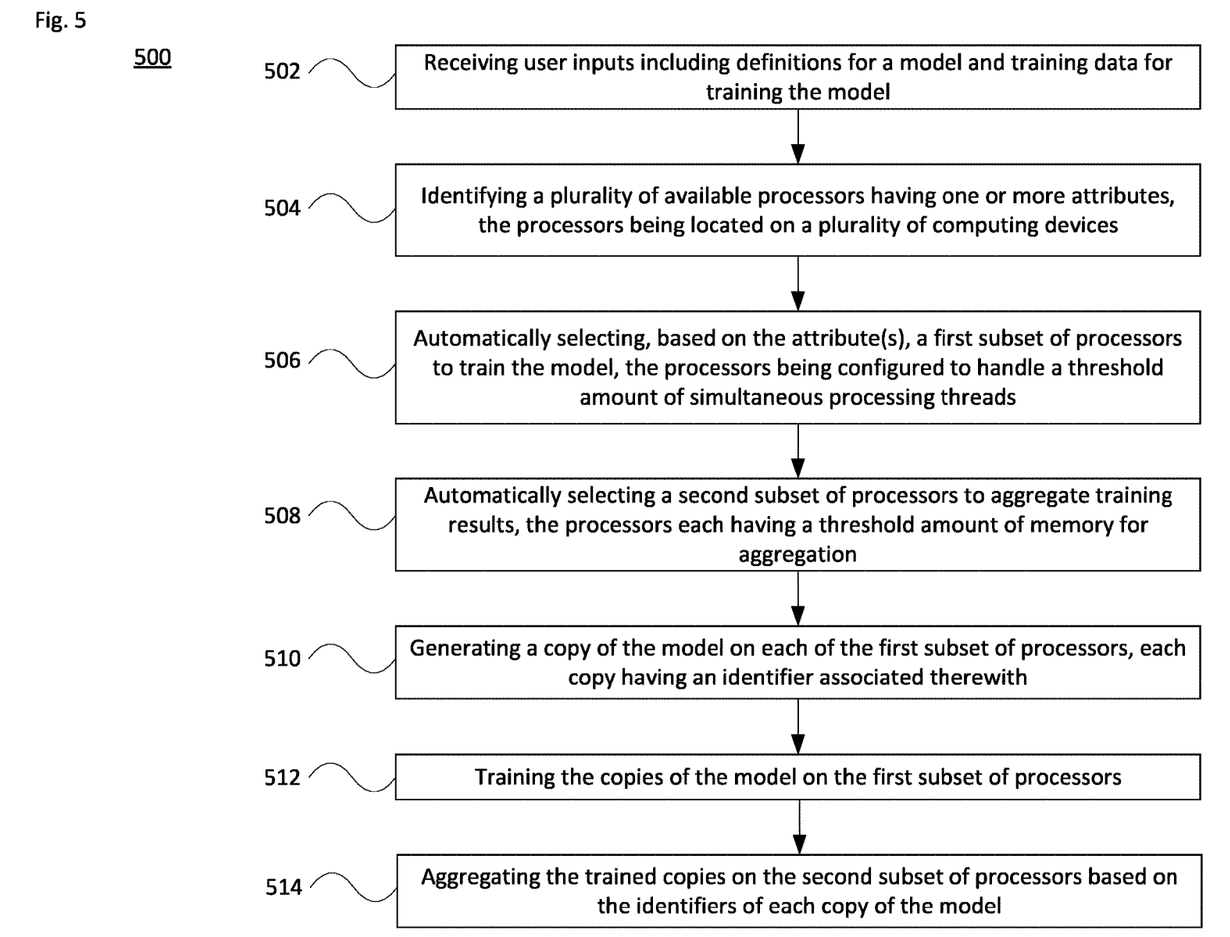
FIG. 5 illustrates an example method of operation in accordance with aspects of the disclosure.

FIG. 5 illustrates an example method 500 for training a model on a distributed system. At block 502, the method includes receiving, by the distributed system, user inputs including definitions for a model and training data for training the model. At block 504, the distributed system identifies a plurality of available processors having one or more attributes. The plurality of available processors is located on a plurality of computing devices in the distributed system. At block 506, the distributed system automatically selects, based on the one or more attributes, a first subset of processors among the available processors to train the model. The processors in the first subset are each configured to handle a threshold amount of simultaneous processing threads. At block 508, the distributed system automatically selects a second subset of processors among the available processors to aggregate training results. The processors in the second subset each have a threshold amount of memory for aggregation. At block 510, the distributed system generates a copy of the model on each of the first subset of processors. Each copy of the model has an identifier associated therewith. At block 512, the distributed system trains the copies of the model on the first subset of processors. And at block 514, the distributed system aggregates, based on the identifiers of each copy of the model, the trained copies of the model on the second subset of processors.

Features of the technology provides efficient training for a machine learning model using a distributed system, without requiring the user to program or otherwise configure the model for processing on different devices. Resources in the distributed system may be effectively allocated for each stage of training the model, including data intake, data pre-processing, training, and aggregation of results. Furthermore, simultaneous processing at each stage may be scaled to reduce or eliminate bottlenecks in the distributed system. In addition, autonomous ongoing monitoring and re-allocating of resources by the system itself may further reduce or eliminate bottlenecks. The technology saves time and effort for users by performing the allocation, scaling, monitoring, and re-allocation without requiring modification to the code of the model.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for training a model on a distributed system, comprising:
    automatically selecting, by the distributed system based on one or more attributes, a first subset of processors among a plurality of available processors located on a plurality of computing devices of the distributed system to train the model, the processors in the first subset each being configured to handle a threshold amount of simultaneous processing threads and having the one or more attributes;
    automatically selecting, by the distributed system, a second subset of processors among the plurality of available processors to aggregate training results, the processors in the second subset each having a threshold amount of memory for aggregation;
    generating, by the distributed system, a copy of the model on each of the first subset of processors, the generating including applying one or more perturbations to an input of the copy of the model, each copy of the model having an identifier associated therewith, the identifiers being used to track how each copy of the model is trained, to track the training results of one copy of the model relative to other copies of the model in order to evaluate different types of training behavior, to augment the training results based on a real world scenario, and to weigh the training results based on a desired distribution, each copy of the model being configured to work on one or more different types of data associated with the model;
    training, by the distributed system, the copies of the model on the first subset of processors; and
    aggregating, by the distributed system based on the identifiers and the training results, the trained copies of the model on the second subset of processors.

2. The method of claim 1, further comprising:
    generating, by the distributed system, an input pipeline to receive a subset of the training data for each of the plurality of computing devices on which one or more copies of the model are to be trained.

3. The method of claim 2, further comprising:
    generating, by the distributed system, a number of simultaneous processing threads to perform data intake at each of the input pipelines, wherein the number of simultaneous processing threads for data intake is scaled by a number of copies of the model to be trained on a respective computing device.

4. The method of claim 3, further comprising:
monitoring, by the distributed system, progress of data intake on the first subset of processors; and
changing, by the distributed system based on the progress, a number of simultaneous threads for the data intake for one or more of the first subset of processors.

5. The method of claim 1, further comprising:
generating, by the distributed system, a number of simultaneous processing threads to pre- process a subset of the training data received at each of the plurality of computing devices, wherein the number of simultaneous processing threads for pre-processing is scaled by a size of the subset of training data received at a respective computing device.

6. The method of claim 5, further comprising:
monitoring, by the distributed system, progress of the pre-processing on the first subset of processors; and
changing, by the distributed system based on the progress, a number of simultaneous threads for pre-processing for one or more of the first subset of processors.

7. The method of claim 1, further comprising:
monitoring, by the distributed system, progress of training on the first subset of processors; and either:
changing, by the distributed system based on the progress, a number of simultaneous threads for training for one or more of the first subset of processors, or
moving, by the distributed system based on the progress, a portion of training data on a first processor of the first subset of processors for training a first copy of the model to a second processor of the first subset of processors for training a second copy of the model.

8. The method of claim 1, further comprising:
generating, by the distributed system, a number of simultaneous processing threads to train copies of the model on each of the plurality of computing devices, wherein the number of simultaneous processing threads for training is scaled by either (i) an amount of a subset of the training data received at a respective computing device, or (ii) an amount of pre-processed training data on the respective computing device.

9. The method of claim 1, further comprising:
generating, by the distributed system, performance data for each of the trained copies of the model; and
comparing, by the distributed system, the trained copies of the model based on the performance data, wherein aggregating the trained copies of the model is based on the comparison.

10. The method of claim 9, further comprising selecting, by the distributed system based on the comparison, a subset of the trained copies of the model, wherein only the selected subset of trained copies are aggregated.

11. The method of claim 9, further comprising assigning, by the distributed system based on the comparison, weights to the trained copies of the model, wherein the trained copies of the model are aggregated based on the assigned weights.

12. The method of claim 1, wherein selecting the first subset of processors and selecting the second subset of processors is based on evaluating a number of cores in each of the plurality of available processors.

13. The method of claim 1, wherein:
each of the first subset of processors has at least a first number of cores and a first amount of memory,
each of the second subset of processors has no more than a second number of cores and a second amount of memory,
the first number of cores being greater than the second number of cores,
and the first amount of memory is smaller than the second amount of memory.

14. The method of claim 1, wherein the identifiers are unique identifiers.

15. The method of claim 1, wherein selecting the first subset of processors is based on at least one of a size of the model or a speed at which the model can be trained by the plurality of available processors.

16. A distributed computing system for training a model, the distributed computing system including a plurality of available processors comprising:
a first subset of processors configured to handle a threshold amount of simultaneous processing threads; and
a second subset of processors each having a threshold amount of memory;
wherein the distributed computing system is configured to:
automatically select the first subset of processors based on one or more attributes;
automatically select the second subset of processors based on the threshold amount of memory;
generate the copy of the model on each of the first subset of processors, the generation including applying one or more perturbations to an input of the copy of the model, each copy of the model having an identifier associated therewith, the identifiers being used to track how each copy of the model is trained, to track the training results of one copy of the model relative to other copies of the model in order to evaluate different types of training behavior, to augment the training results based on a real world scenario, and to weigh the training results based on adesired distribution, each copy of the model being configured to work on one or more different types of data associated with the model;
train the copies of the model on the first subset of processors in accordance with the threshold amount of simultaneous processing threads; and
aggregate, based on the identifiers and the training results, the trained copies of the model on the second subset of processors in accordance with the threshold amount of memory.

17. The distributed computing system of claim 16, wherein the distributed computing system is further configured to:
monitor progress of training on the first subset of processors; and either:
change, based on the progress, a number of simultaneous threads for training for one or more of the first subset of processors, or
move, based on the progress, a portion of training data on a first processor of the first subset of processors for training a first copy of the model to a second processor of the first subset of processors for training a second copy of the model.

18. The distributed computing system of claim 16, wherein the distributed computing system is further configured to:
generate performance data for each of the trained copies of the model; and
compare the trained copies of the model based on the performance data, wherein aggregation of the trained copies of the model is based on the comparison.

* * * * *

UNITED STATES PATENT AND TRADEMARK OFFICE
CERTIFICATE OF CORRECTION

PATENT NO. : 11,941,519 B2
APPLICATION NO. : 16/699920
DATED : March 26, 2024
INVENTOR(S) : Pok Man Chu et al.

It is certified that error appears in the above-identified patent and that said Letters Patent is hereby corrected as shown below:

In the Claims

Column 14, Line 25, Claim 16:
Now reads: ""inciuding"; should read -- including --

Column 14, Line 35, Claim 16:
Now reads: "adesired"; should read -- a desired --

Signed and Sealed this
Fourteenth Day of May, 2024

Katherine Kelly Vidal
*Director of the United States Patent and Trademark Office*